United States Patent [19]
Roskowski et al.

[11] Patent Number: 5,274,753
[45] Date of Patent: Dec. 28, 1993

[54] APPARATUS FOR DISTINGUISHING INFORMATION STORED IN A FRAME BUFFER

[75] Inventors: Steven G. Roskowski, Sunnyvale; Elizabeth A. Clough, Menlo Park, both of Calif.

[73] Assignee: Apple Computer, Inc., Cupertino, Calif.

[21] Appl. No.: 49,876

[22] Filed: Apr. 19, 1993

Related U.S. Application Data
[63] Continuation of Ser. No. 528,694, May 24, 1990, abandoned.

[51] Int. Cl.[5] .............................................. G06F 15/62
[52] U.S. Cl. .................................... 395/135; 395/153; 395/154; 395/164; 345/116
[58] Field of Search ................ 395/135, 153, 154, 164; 340/725, 734

[56] References Cited

U.S. PATENT DOCUMENTS
| | | | |
|---|---|---|---|
| 5,043,923 | 8/1991 | Joy et al. | 395/164 |
| 5,050,102 | 9/1991 | Sun et al. | 340/725 |
| 5,097,257 | 3/1992 | Clough et al. | 340/814 |
| 5,220,312 | 6/1993 | Lumelsky et al. | 340/721 |

*Primary Examiner*—Mark K. Zimmerman
*Attorney, Agent, or Firm*—Blakely, Sokoloff, Taylor & Zafman

[57] ABSTRACT

An arrangement for storing video and graphic information from video and graphics sources to be displayed on a computer output display including a single frame buffer having first and second separately addressable areas, the first of such areas being adapted to store pixel information, the second of such areas being adapted to store information regarding the type of information stored at each pixel of the first of such areas.

7 Claims, 3 Drawing Sheets

APPARATUS FOR DISTINGUISHING INFORMATION STORED IN A FRAME BUFFER

This is a continuation of application Ser. No. 07/528,694 filed May 24, 1990, now abandonded.

BACKGROUND OF THE INVENTION

1. Field of the Invention

This invention relates to computer graphics systems and, more particularly, to methods and apparatus for storing signals appearing in both interlaced video and non-interlaced graphics modes in a single frame buffer.

2. History of the Prior Art

It is the vision of many that in the near future a person sitting at a personal computer will be able to call information from a number of different sources. For example, it is expected that a person will be able to hear telephone and radio communications, view television or recorded motion pictures, play stereo recordings of music, and operate computer graphical and text programs. It is also expected that all of these operations will be possible at the same time so that, for example, a television program may appear in one window of a computer display while a computer graphics program is running in another window, or computer graphics material may appear as an overlay on the television program.

It is much easier to visualize the results that one would like to reach than to reach those results, especially where the results require the combining of television (video) signals with computer graphics signals on the same output monitor. The crux of the problem is that, although both types of signals are electrical, they arrive in entirely different formats for their two purposes. The computer signals are digital while the television signals are analog and must first be converted to digital representations for presentation on a computer monitor. Moreover, the television signals (video) are presented at a different frequency than are the computer signals. The television signals appear in an interlaced pattern consisting of a first field having a reduced number of lines followed by a second field having the same reduced number of lines approximately one-sixtieth of a second later which is combined with the first to form a complete picture. The reason for the interlaced display is that it allows a less expensive monitor to present pictures which are entirely acceptable for television purposes. However, such a monitor is not acceptable for computer graphics where much more detail must be displayed and manipulated. Today, a typical computer display presents at least twice as many lines of data in a non-interlaced mode.

Thus, the data from these two different sources of two different types, interlaced and non-interlaced, must somehow be presented in a form which can be handled by a personal computer. The usual method suggested in the prior art is to convert the analog video data to digital data and place it in a first frame buffer, place the computer graphics data in a second frame buffer, and somehow switch between the two frame buffers in presenting the data to an output monitor. However, the video data stored in the video frame buffer is still in the interlaced form in which it came from a television or similar source while the computer data is stored in non-interlaced form in its frame buffer. The visionary also expects to be able to present both the video and the computer graphics held in these frame buffers together on either an interlaced television type monitor or a computer monitor of some sort. Thus, interlaced video data and non-interlaced computer data must somehow be intermingled and displayed on both interlaced and non-interlaced monitors at the option of the operator.

In order to deal with such different forms of data, it is necessary for the computer to recognize that the data is in one or the other of the two forms. The dual frame buffers provide this designation for the different types of data. Although the arrangement does provide, through its use of separate frame buffers, for easy determination of which information is video and which is graphics, it still requires circuitry or software for assigning the different types of information to different parts of the display. Moreover, in order to handle the transfers of information from interlaced to non-interlaced and vice-versa and to determine the information which is to be displayed at boundaries between the different types of information, it is necessary for a system to know the type of information in any position surrounding any pixel to be displayed. Such information allows the system to know what to do with the pixel information. Then the pixel information must be differently handled depending on the type of information, the boundary condition involved, and the type of display on which it is to be presented.

Ultimately, the prior art arrangements emphasize the single largest cost in designing computer devices, the cost of the memory associated with such devices. By using a full frame buffer to store each of the video and computer graphics inputs, the cost of the frame buffer memory is doubled over the cost for a conventional computer arrangement. Added to this is probably the cost of an additional buffer memory to store information regarding the type of data assigned to an area of the display.

SUMMARY OF THE INVENTION

It is, therefore, an object of the present invention to provide an architecture for a frame buffer used in a computer system capable of storing video and computer graphics information simultaneously.

It is another more specific object of the present invention to provide a unique video memory arranged so that both the input to and the output from the memory are controlled to allow the use of both video and computer graphics information.

These and other objects of the present invention are realized in a frame buffer memory arrangement in which information from both computer graphics input and video input sources are stored comprising a single frame buffer divided into a portion for storing information from both video and computer graphics sources and a portion for storing an indication of the type of information included for each portion of information stored from which a determination of its use may be derived.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
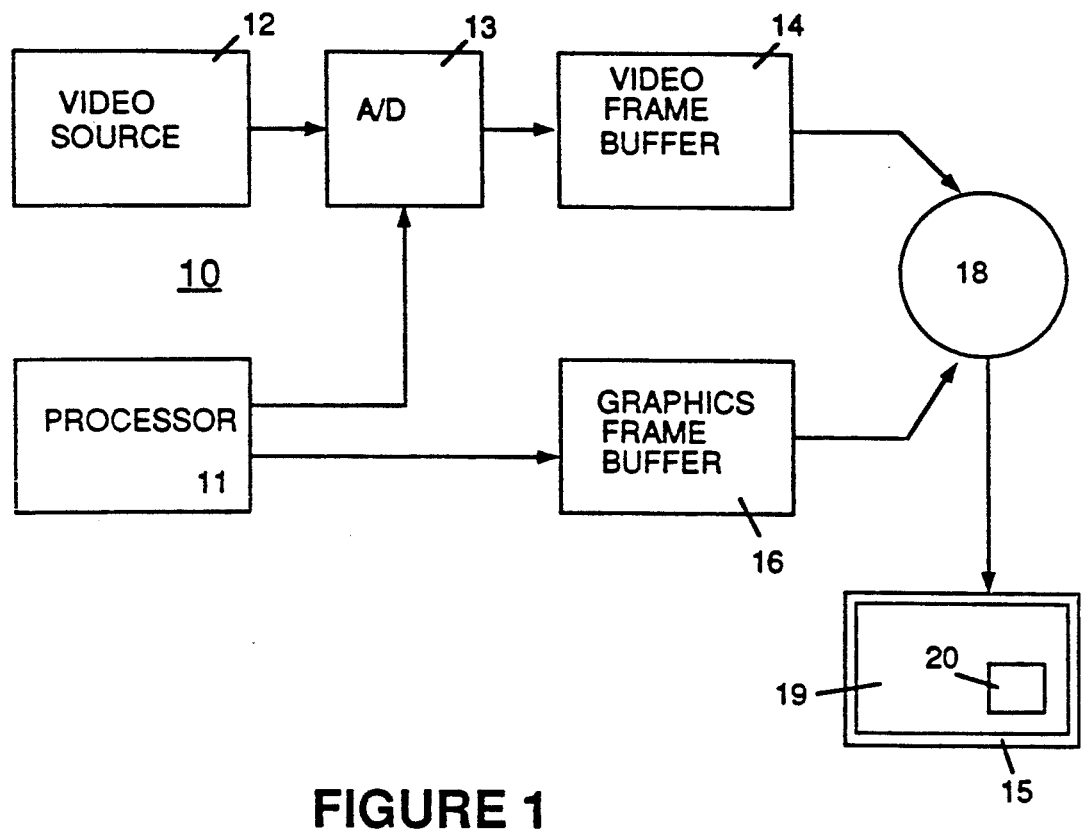
FIG. 1 is a block diagram illustrating an architecture typically used by the prior art for presenting both video information and computer graphic information simultaneously on an output display.

FIG. 1 illustrates in block diagram form an architecture typically used by the prior art for presenting both video information and computer graphic information simultaneously on an output display. An arrangement 10 includes a computer processor 11 which exerts overall control of the arrangement 10 and furnishes the computer graphics signals which are to be manipulated. For the purpose of this discussion, the processor 11 is considered to include the normal functions of a computer (such as input/output, memory, and the like) other than those necessary to cause the display of the two types of information on a computer output display.

In the arrangement 10, analog video signals such as NTSC or PAL signals are presented from a standard video source 12 at an analog-to-digital converter circuit 13. The analog-to-digital converter circuit 13 is of a form well known to those skilled in the art. The circuit 13 receives the video signals and, using the system clock provided by the processor 11, converts those signals to color or black and white digitized pixels representing the incoming video information. The digitized signals representing the entire field of video information are then transferred to a first frame buffer 14 under control of the computer processor 11. The entire field of computer graphical information to be displayed on an output display 15 is, in a similar manner, transferred by the processor 11 to a second frame buffer 16. The processor 11 then controls the selection of information from one or the other of the two frame buffers 14 and 16 by means of a switching arrangement 18 for presentation on the computer output display 15.

FIG. 1 shows displayed on the computer output display 15 a first large rectangle representing the outline of the entire display. The computer output display 15 is a conventional bit-mapped display which may be used to illustrate computer graphic output information. The computer output display 15 has superimposed on the first large rectangle 19 a smaller rectangle 20 representing a window in which a video image might be furnished for display. This is the general form of output provided by the prior art and by a computer utilizing the present invention.

The arrangement illustrated in FIG. 1 is certainly one way of implementing circuitry to allow both video and computer graphics information to be displayed on the same computer output display at the same time. However, as pointed out above, the arrangement is very expensive in its use of frame buffer memory. Moreover, although the arrangement does provide, through its use of separate frame buffers for video and graphics information, for easy determination of which information is video and which is graphics, it still requires circuitry or software for assigning the different types of information to different parts of the display. Moreover, in order to handle the transfers of information from interlaced to non-interlaced representations and vice-versa and to determine the information which is to be displayed at boundaries between the different types of information, it is necessary for a system to know the type of information which resides in any position surrounding any pixel to be displayed. This information allows the system to know what to do with the pixel information. Then the pixel information must be differently handled depending on the type of information, the boundary condition involved, and the type of display on which it is to be presented. Thus, the system must be able to deal with the attributes of the information separately from the pixel information itself. In the system of FIG. 1, this will probably require an additional frame buffer for storage of assignment information.

Figure 2:
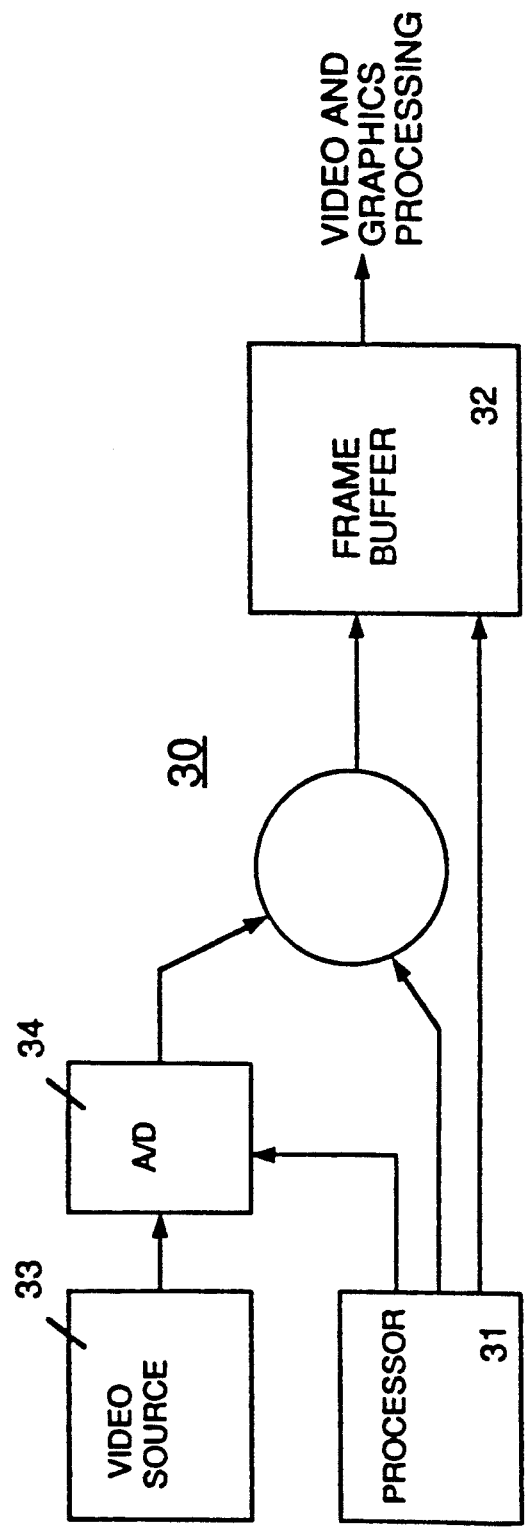
FIG. 2 is a block diagram illustrating a system architecture by which both video information and computer graphics information may be stored simultaneously.

FIG. 2 illustrates in block diagram form an architecture 30 in accordance with the present invention. The architecture 30 includes a processor 31 which provides computer graphics information to a graphics frame buffer 32. Again, for the purpose of this description the processor 31 will be considered to include those elements used in the normal operation of a general purpose computer. Video information is furnished from a video source 33 to an analog-to-digital converter 34 for conversion under control of the system clock to digital signals which may be handled by the computer 30. The stream of information from the analog-to-digital converter 34 is transferred by switching means 35 under control of the processor 31 to the graphics frame buffer 32 for storage. The processor 31 designates the type of information is to be stored at each pixel of the graphics frame buffer 32. Thus, the processor 31 may control information at a first pixel to be stored from the stream of information provided by the video source 33 through the digital-to-analog converter 34 while it may select the next pixel from the information provided by the processor 31.

U.S. patent application Ser. No. 528,703, entitled APPARATUS FOR STORING BOTH VIDEO AND GRAPHICS SIGNALS IN A SINGLE FRAME BUFFER, Roskowski et al., filed on even date herewith, describes in detail a system for accomplishing the processing of video and computer graphics information in the manner described above. U.S. patent application Ser. No. 07/456,320, now U.S. Pat. No. 5,097,257, issued Mar. 17, 1992, entitled APPARATUS FOR PROVIDING OUTPUT FILTERING FROM A FRAME BUFFER STORING BOTH VIDEO AND GRAPHICS SIGNALS, Clough et al., filed Dec. 26, 1989, describes an arrangement for handling video and computer graphics information once it has been placed in one or more frame buffers in a single computer in order to present that information on either television or computer display output terminals. In both of the arrangements described, it is necessary that the information at each individual pixel of the frame buffer be described as either video or graphics information so that the information may be appropriately treated.

The present invention relates to the single frame buffer arrangement for storing all of the video and computer graphics information while accomplishing the description necessary to the storage and use of the information. The frame buffer 32 stores a full frame of pixel information which may be both video and computer graphics information stored in a geometric arrangement which mirrors the output display so that the data for each pixel is stored at positions which are essentially the positions at which it will be displayed on the output display. Also stored in the physical frame buffer 32 in what appears to the processor 31 to be a separate frame buffer are indications of the type of data stored at each position of the pixel frame buffer stored therewith so that the pixel information may be processed by succeeding circuitry for presentation on a computer output display (not illustrated in FIG. 2). This second so-called attribute frame buffer is arranged to be addressed and handled separately from the pixel frame buffer so that the information in each separate frame buffer may be handled separately.

Figure 3:
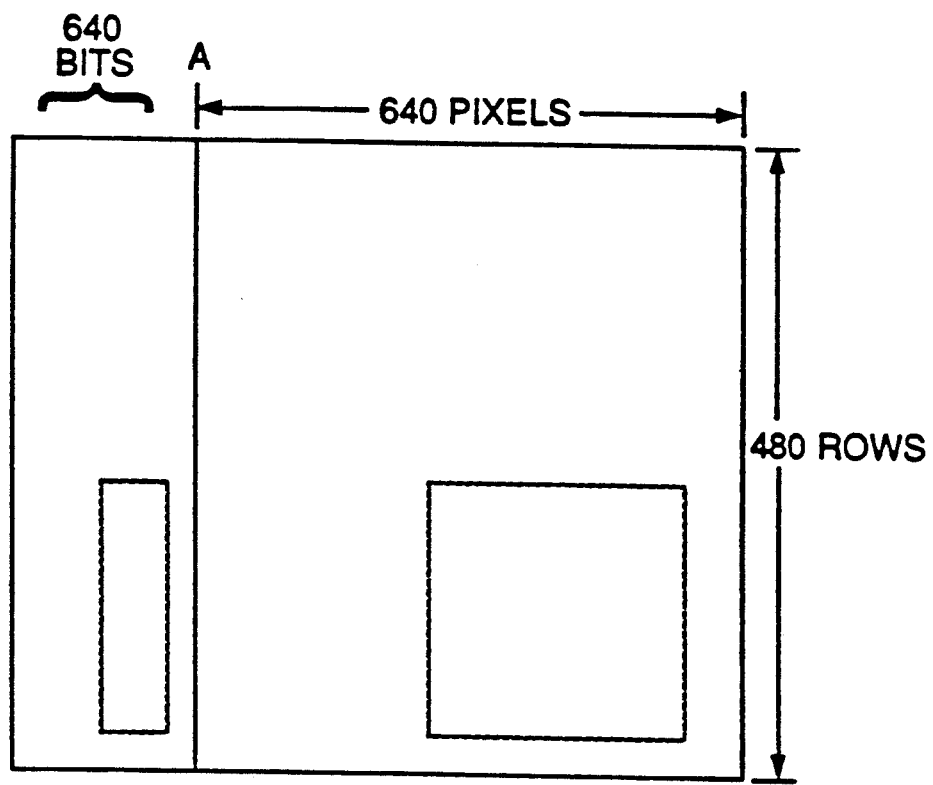
FIG. 3 is a block diagram illustrating a frame buffer constructed in accordance with the invention.

FIG. 3 is an illustration of the physical frame buffer 32 used in the invention. A particular frame buffer 32 may provide in a first section (to the right in the figure) storage for 640 individual pixels of color information in each row and may have 480 individual rows of pixel information. In the preferred embodiment of the invention, the color information relating to each pixel is stored serially in the array which forms the frame buffer 32 in red/green/blue order. This may comprise twenty-four bits of color information, eight bits of color information, or black and white information. In the preferred embodiment, the number of bits per pixel is programmable so that any of these values may be selected. The bits for each pixel are shown arranged in serial order in each row in FIG. 3 with a total of 640 pixels shown in each row.

It will be noted in FIG. 3 that the frame buffer 32 stores the pixel information beginning at a position marked as position A in the figure. In the preferred embodiment of the invention, position A is selected to begin at least a sufficient distance from the beginning of each row of the frame buffer 32 so that one bit may be stored for each of the pixels stored to the right on the line of the frame buffer 32. Thus if there are 640 pixels stored in the first row of the frame buffer 32 (whether those pixels be of twenty-four, eight, or other bit size), then the pixel storage commences at least 640 bits from the beginning left end of the first row. The other rows of the frame buffer 32 store the information in a similar manner beginning with the attribute bits for each pixel position in the row followed by the pixel information beginning at position A on each row. In this manner, an attribute bit may be stored on the same line as the pixel to which it refers to enable that pixel, first, to receive information from the appropriate video or graphics source for storage at that position of the frame buffer 32 and, second, to allow the type of pixel stored at a particular position in the frame buffer 32 to be determined so that it may be appropriately manipulated as it is furnished to the output display.

Thus the bit indicating the attribute of a pixel may be addressed at an address on a row which has a bit position (or address) identical to the pixel position (or address) of the pixel it identifies. That is, an attribute bit ten bits from the beginning of a row designates the type of pixel (video or graphics) stored at the tenth pixel position of that row. In the preferred embodiment, if the pixels are twenty-four bits in length, then the pixel information will lie in the 28th, 29th, and 30th bytes from position A while the attribute bit will lie in the second byte from the left end of the row. In the preferred embodiment of the invention, thirty-two bits of information are necessary to address a pixel in the frame buffer; the upper bits designate the row while the lower ten bits select the pixel from the row. The pixel information may be addressed just as it would normally be addressed in a frame buffer simply by adding the value A to the starting address of each pixel position and increasing the length of a row used in incrementing between rows in the frame buffer 32. The attribute information may be addressed using the pixel address less the A value but calling each pixel a single bit.

If a window of video information is stored in the physical frame buffer 32 illustrated in FIG. 3, for instance, that information might be stored in the area illustrated in dotted outline within the pixel position area. This area would be initially selected to be a window and so designated by the program to contain video information while the remainder of the pixel area would be designated to store graphics information. This result would be accomplished by storing attribute bits designating where video information is to be stored within the dotted area of the attribute portion of the frame buffer 32 and attribute bits designating where graphics information is to be stored in the remainder of the attribute area. In the preferred embodiment of the invention, a binary one is stored in the attribute area to indicate that graphics information is to be stored at a particular pixel position. By storing a one for graphics information, a zero may be used to designate pixels to contain video information. Then the processor compares the attribute bits and writes graphics information to those pixel positions containing ones as attribute bits. For any pixel position containing a zero, a pixel from the stream of information from the video source is written to the frame buffer 32.

It will be understood that the attribute bits need not be placed at the beginning of each row of the frame buffer 32 in order to allow the storage of the pixel information from the correct video or graphics source at the correct pixel position. The attribute bits need only be stored in positions within the frame buffer 32 so that they may be accessed to designate for each pixel as it is written to the frame buffer whether that pixel is to be selected from the video input source or from the graphics source. A convenient area of storage within the frame buffer 32 will suffice for this purpose so long as the processor may write the position designated for video and for graphics into this area to provide a pattern of comparison for the processor to use in writing the video information to areas designated by the program to hold video and the graphics information to areas designated by the program to hold graphics information.

However, placing the attribute bits for each row at the beginning of each row is very useful in manipulating the information for display on the computer output display. As is described in detail in the Clough et al. patent application Ser. No. 07/456,320, entitled APPARATUS FOR PROVIDING OUTPUT FILTERING FROM A FRAME BUFFER STORING BOTH VIDEO AND GRAPHICS SIGNALS, referred to above, the treatment each pixel receives before presentation on the display depends of the characteristics of the surrounding pixels so it is necessary to know the type of information at pixel positions before the pixel information is available. Since frame buffers are economically implemented in video random access memory which has a shift register to shift out a row of information in sequential order and it is necessary to have the information regarding the information to be read out to know how to handle that information, by placing the attribute information at the beginning of a line, the attribute information is immediately available for the pixels of that row without the necessity of a separate read operation and the delay attendant upon that separate read operation.

Another advantage of the arrangement which places the attribute bits for a row on the same row as the pixel information is that the attribute bits are accessed in the same page of video random access memory. This allows a fast page cycle to be used in accessing both attribute bits and pixel information. Consequently, access in the frame buffer may be accomplishes approximately four times faster than were it necessary to cross page boundaries.

An additional advantage of the arrangement is that by using a single attribute bit for each pixel and placing all attribute bits for a row of pixels together, they may be separately addressed in large groups (32 or 64 bits) and used to control the storing of information in the frame buffer 32. Only one access is required to provide information about a large number of pixels rather than a large number of single accesses of individual pixels.

The fact that the attribute bits are stored in a separate and separately addressable area of the frame buffer 32 allows those bits which directly affect the clipping to place video, for example, in a window on a display to be manipulated separately and apart from the actual color information. On the other hand, the color information may also be manipulated separately from the attribute information to provide the optimum form for storage depending upon the particular size and content of the pixels.

It will be recognized by those skilled in the art that a substantial advantage offered by the present invention is that since only a single frame buffer is required for its operation, a substantial amount of relatively expensive computer circuitry is not required. For example, if the computer output display is capable of displaying 640 by 480 pixels of twenty-four bit color information, storage for over seven million bits of information is eliminated.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An arrangement for storing video and graphic information from video and graphic sources to be displayed on a computer output display comprising a single frame buffer having first and second separately addressable areas, the first of such areas being adapted to store pixel information from both video and graphic sources, the second of such areas being adapted to store information regarding a type of information stored at each pixel of the first of such areas.

2. An arrangement as claimed in claim 1 for storing video and graphic information from video and graphic sources to be displayed on a computer output display further comprising means for providing information to the second such area regarding which positions of the first such area are to receive graphics information and which are to receive video information.

3. An arrangement as claimed in claim 1 for storing video and graphic information from video and graphics sources to be displayed on a computer output display in which a single bit is stored in the second such area to indicate the type of information for each pixel in the first of such areas.

4. An arrangement as claimed in claim 1 for storing video and graphic information from video and graphic sources to be displayed on a computer output display in which the second such area is positioned relative to the first such area such that information regarding the type of information included at each such pixel of the first such area may be accessed before the pixel information is accessed when the pixel information is written to an output display.

5. An arrangement for storing video and graphic information from video and graphics sources to be displayed on a computer output display comprising a single frame buffer arranged with a plurality of equal-length rows having first and second separately addressable areas, the first of such areas being adapted to store pixel information from both video and graphic sources, the second of such areas being adapted to store information regarding a type of information stored at each pixel of the first of such areas.

6. An arrangement as claimed in claim 5 for storing video and graphic information from video and graphics sources to be displayed on a computer output display in which the information in any row of the second such area is positioned in a row with the pixels of the first such area which that information of the second area describes and in a position such that information regarding the type of information included at each such pixel may be accessed before the pixel information is accessed when the information is written to an output display.

7. An arrangement as claimed in claim 5 for storing video and graphic information from video and graphics sources to be displayed on a computer output display in which a single bit is stored in the second such area to indicate the type of information included each pixel in the first of such areas.

* * * * *